(12) United States Patent
Radbourne et al.

(10) Patent No.: US 6,435,495 B1
(45) Date of Patent: Aug. 20, 2002

(54) BACK-UP CLAMP COMPONENT

(76) Inventors: Kevin Alan Radbourne, Cinquefoil, Bidford Road, Ardens Grafton, B49 6DP; Zdzislaw Leon Drewnicki, 115 Knights Lane, Tiddington, Stratford.u.A., CV37 7BZ; John Simon Eastham, 2 Stretton Close, Stretton on Fosse, Moreton in Marsh, GL56 9QZ; Keith Vickery, 122 Evesham Road, Stratford upon Avon, CV37 9BH, all of (GB)

( * ) Notice: Subject to any disclaimer, the term of this patent is extended or adjusted under 35 U.S.C. 154(b) by 0 days.

(21) Appl. No.: 09/560,753

(22) Filed: Apr. 28, 2000

(30) Foreign Application Priority Data

Feb. 12, 2000 (GB) .............................................. 0003148

(51) Int. Cl.[7] .............................................. B23K 37/04
(52) U.S. Cl. ..................................... 269/48.1; 228/49.3
(58) Field of Search ................. 269/48.1, 43; 228/44.5, 228/49.3; 29/272

(56) References Cited

U.S. PATENT DOCUMENTS

| 2,780,194 A | 2/1957 | Croswell | |
| RE28,190 E | * 10/1974 | La Force et al. | 269/48.1 |
| 4,177,914 A | 12/1979 | Clavin | |
| 4,418,860 A | * 12/1983 | La Force | 228/44.5 |
| 5,110,031 A | 5/1992 | Rinaldi | |
| 5,288,005 A | * 2/1994 | Beakley et al. | 228/49.3 |
| 5,816,475 A | * 10/1998 | Brookhouse | 228/49.3 |

FOREIGN PATENT DOCUMENTS

| EP | 0 193 812 | 9/1986 |
| GB | 1 528 775 | 10/1978 |
| GB | 2 067 945 | 8/1981 |
| WO | WO 95/21721 | 8/1995 |

* cited by examiner

*Primary Examiner*—Robert C. Watson
(74) *Attorney, Agent, or Firm*—Ken J. Pedersen; Barbara S. Pedersen

(57) ABSTRACT

A back-up clamp component for use in a back-up clamp and adapted to fit with other sections of the back up clamp, the component carrying a number of shoes which can be moved radially inwardly and outwardly, each shoe being connected to a respective piston and cylinder arrangement, each piston having a first side and a second side, first means permitting pressurised fluid to be introduced to the first side of a piston and second means permitting pressurised fluid to be introduced to the second side of a piston so that the shoes can be positively driven outwardly and inwardly, the first means and the second means including respective first and second conduits within the body, which conduits open at an end face of the component.

18 Claims, 7 Drawing Sheets

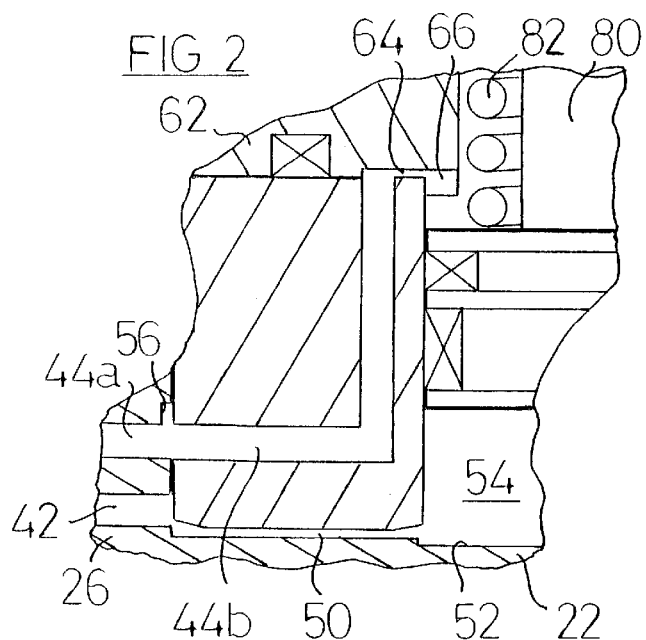
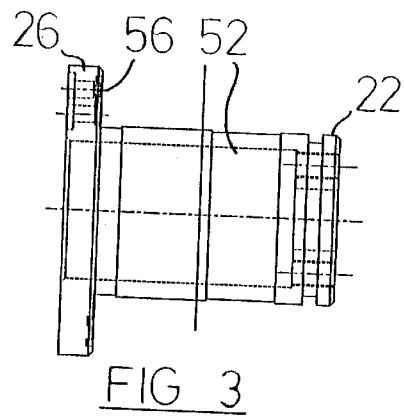
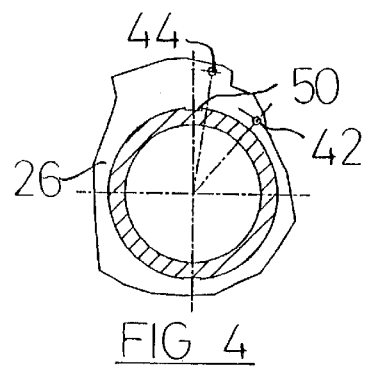
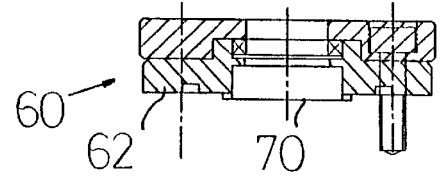
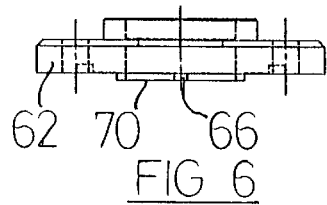
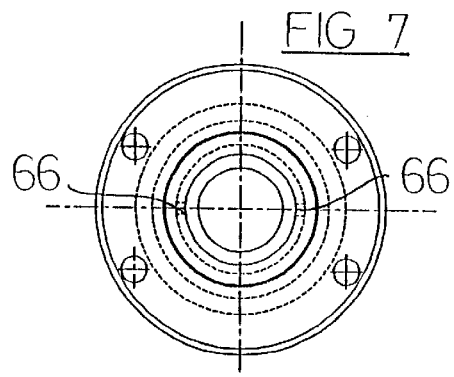

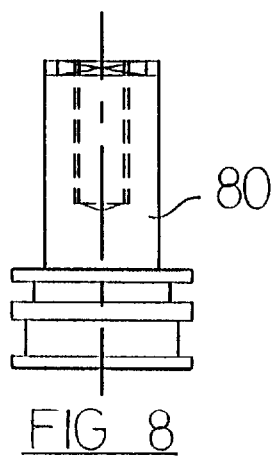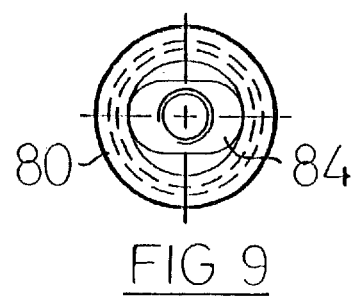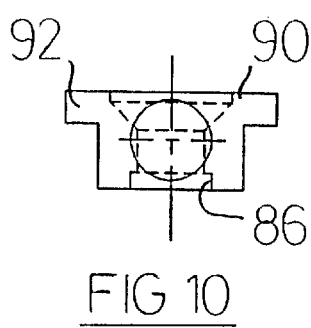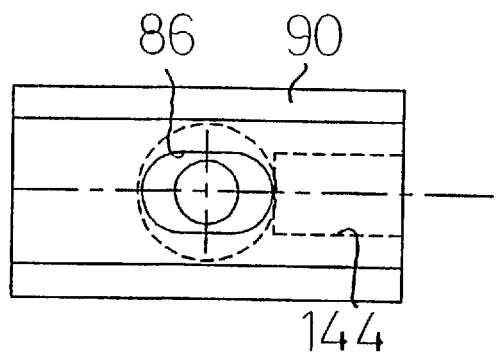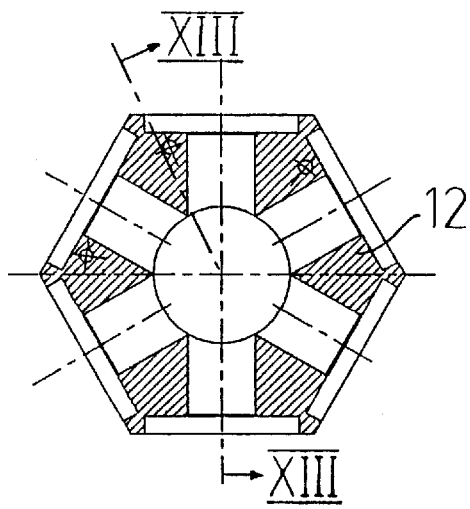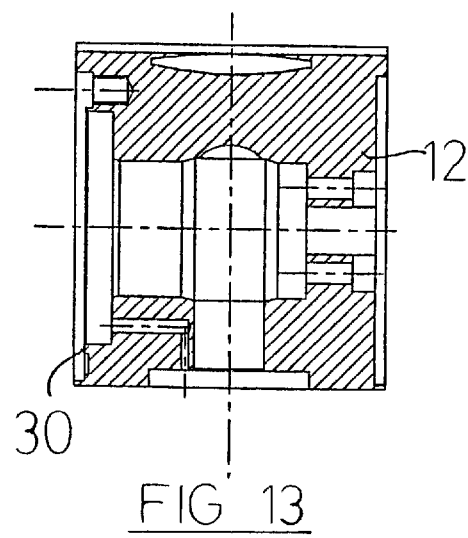

BACK-UP CLAMP COMPONENT

FIELD OF THE INVENTION

This invention relates to a back-up clamp component for use in a back-up clamp for the welding of pipelines.

BACKGROUND TO THE INVENTION

Pipelines are in widespread use for the transportation of fluids such as water, gas and oil. Many such pipelines are of metal and are manufactured in lengths which must be assembled on site into the complete pipeline. To connect two adjacent lengths of pipe together it is usual to provide a welded joint. Thus, a new length of pipe is placed close to the end of the existing pipeline and a welded joint is formed therebetween (it is usual for a small gap to be present between the adjacent pipe ends prior to welding, which gap is filled by the weld). A subsequent length of pipe is then placed against the new end of the (extended) pipelipe, and the procedure is repeated.

To ensure an accurate and effective weld it is necessary that the two adjacent pipe ends be maintained in alignment during welding. In addition, a known concern with such welded joints is that weld material can be spattered through the gap and into the interior of the pipe, and can impair the subsequent flow of fluid therealong. It is therefore known to insert a back-up clamp into the pipeline adjacent the joint to be welded, the clamp serving to align the two pipe ends and also having a number of shoes which can be moved to lie beneath the gap and prevent any weld spatter from entering into the pipeline. Copper has been found to be a preferred material for the shoes, and in particular copper "101".

DESCRIPTION OF THE PRIOR ART

A back-up clamp of the type described is disclosed in WO 95/21721. The back-up clamp comprises two sets of clamping members which are adapted to engage the respective pipes adjacent their ends and to assist the alignment of the pipe ends. Between the clamping members is a ring of copper shoes which is adapted to lie underneath the gap during welding. The clamping members and the copper shoes are movable between a retracted condition in which the back-up clamp can be moved along the pipeline, and an extended condition in which the clamping members and the copper shoes engage the inside surface of the respective pipes, the copper shoes lying immediately beneath the gap. The clamping members are moved inwardly and outwardly by a toggle mechanism actuated by pneumatic means. The copper shoes are urged into their extended condition by springs, and into their retracted condition by hooks carried by the clamping shoes.

It is a recognised disadvantage of the known device that it can only be used for larger diameter pipelines, i.e. those of around 8 inches (20.3 cm) diameter or greater, the size of the mechanical toggle linkages effectively providing the lower limit to the size of the device and thus the pipelines upon which the device can be used.

In addition, it is known that debris or other matter within the pipeline adjacent the gap can cause a copper shoe to fail to make contact with the wall of the pipe, so that weld spatter can subseqently enter the pipeline adjacent that shoe. Thus, since it is only the relatively weak spring force that is urging the copper shoes into contact with the pipeline this force cannot overcome certain debris in the path of the shoe.

Furthermore, because the clamping members are required to ensure the alignment of the pipe ends they are necessarily located close together (so that each can be located close to the end of its respective pipe). The need to locate the clamping members close together significantly limits the design freedom for the copper shoes (which lie between the clamping members). In addition, since the clamping shoes are located close to the ends of their respective pipes, whilst they can seek to ensure that the ends of the pipes are substantially concentric, they cannot necessarily ensure complete alignment of the pipes, since the longitudinal axes of the pipes may not be parallel. If the longitudinal axes of the pipes are not parallel the size of the gap will vary around the circumference of the pipeline, so that the effectiveness and reliability of the weld may be impaired.

Also, since the clamping members are not located at the very ends of the respective pipes, some misalignment (i.e. a lack of concentricity of the pipe ends) may be present, which misalignment can cause discontinuities or lips internally of the pipeline; clearly the presence of such discontinuities is likely to cause vortices and thus pressure drops along the pipeline (which pressure drops can accumulate and become considerable in a long pipeline).

GB Patent Application 2,067,945 also discloses a back-up clamp of the general type described. In this design also, the back-up shoes are urged into contact with the pipeline by spring force alone, so that the disadvantages of such an arrangement outlined above are shared by the devices of this disclosure. The back-up shoes are located adjacent (and indeed are carried by) the clamping members, and so the device is less well able to correctly align the longitudinal axes of the pipes which are to be welded.

U.S. Patent 5,110,031 discloses a back-up clamp in which the back-up shoes are of a ceramic material. In this document the clamping members and the back-up shoes are moved radially by respective radially acting pistons. It is indicated that the pistons are actuated by pneumatic or hydraulic means. No means is disclosed for the retraction of the clamping members or the back-up shoes.

GB Patent 1,528,775 discloses a back-up clamp in which the clamping members are actuated by way of a toggle mechanism, i.e. a piston is moved longitudinally by hydraulic or pneumatic pressure, and the longitudinal movement is converted to radial movement of the clamping members by mechanical links. The back-up shoes are however moved radially by radially acting piston and cylinder arrangements. Hydraulic or pneumatic pressure can be fed to both sides of the piston to effect forced extension and retraction of the back-up shoes.

Utilising hydraulic or pneumatic pressure to drive out the back-up shoes avoids the disadvantages outlines above for those disclosures relying upon spring force alone. The most significant advantage is that the force which can be exerted upon the pipeline (or rather the ends of the adjacent pipes which are to be welded together) is much increased, allowing the back-up shoes to contribute to the alignment of the pipes. This in turn permits the clamping members to be spaced further from the ends of the respective pipes than would otherwise be possible, increasing the likelihood that the longitudinal axes of the pipes are aligned.

There is also a significant advantage in driving the back-up shoes both outwardly and inwardly, i.e. rather than relying upon spring force to achieve the inward retraction movement, for example. Thus, when the back-up shoes are positively driven inwardly by hydraulic or pneumatic pressure there is far less likelihood of the back-up shoes "sticking" in their extended condition. Should the back-up shoes stick in their extended condition it would be difficult or perhaps impossible to move the clamp along the pipeline.

Notwithstanding the advantages of the device as disclosed in U.K. Patent 1,528,775, it is not in widespread use; and this is believed to be because of the complexity of the device. Thus, the device is mechanically complex, and also requires complex and numerous hydraulic and/or pneumatic connections to be made to communicate the pressurised fluid to the sites upon the clamp at which it is required.

In addition, the pressurised fluid is fed to the cylinder housing the piston of the back-up shoe by way of hoses connected to the clamp body immediately beneath the back-up shoe. With clamps for larger-diameter pipelines there is usually enough space to accommodate the hoses and permit access to the hose connections, but this becomes increasingly difficult to achieve as the diameter of the pipeline, and thus the diameter of the clamp, becomes smaller.

In addition, the hoses pass around a part of the clamp body, and are therefore susceptible to damage. Accordingly, great care has to be taken, both during use of the clamp and also during on-site and off-site handling, to ensure that no damage is caused to the hoses. If any damage is caused to a hose, this might not become apparent until the clamp is in use, perhaps preventing the back-up shoes operating for example; this will result in considerable wastage of time whilst the clamp is retrieved from within the pipeline, and repaired.

Should a hose become damaged, in order to repair the clamp a replacement hose is required to be available, and this might not always be the case on site.

Finally, should the hoses delivering fluid to both sides of the piston become damaged and require replacement, it is essential that they are correctly connected so that the fluid is communicated to the correct location of the clamp.

STATEMENT OF THE INVENTION

It is the object of the present invention to provide a back-up clamp component, and in particular a support section for the back-up shoes, which in use avoids or reduces the disadvantages with the prior devices described above.

According to the invention therefore there is provided a back-up clamp component carrying a number of shoes which can be moved radially inwardly and outwardly, the shoes being connected to respective piston and cylinder arrangements, the axis of each piston and cylinder arrangement being substantially radial, there being means to introduce pressurised fluid to both sides of the piston so that the shoes can be positively driven outwardly and inwardly, the means to introduce pressurised fluid to both sides of the piston including respective conduits within the body of the component, characterised in that the conduits open at an end face of the component.

For the avoidance of doubt, an end face is one of the two generally flat faces of the component which in the assembled back-up clamp will engage adjacent clamp sections.

Because the conduits terminate at an end face of the component, the component is suited to use with a back-up clamp in which the fluid conduits are located within the clamp, such as that disclosed in our co-pending GB patent application for a "Back-Up Clamp". In such arrangements, the component is adapted to be secured to an adjacent clamp section having conduits which themselves open at a corresponding end face of the respective section so that when the component and adjacent section are secured together the conduits line up and fluid can flow from the conduit of the adjacent section to the conduit of the component, and vice versa.

Such an arrangement avoids the requirement for hoses external to the clamp body, so eliminating the likelihood of damage thereto.

Preferably, the piston and cylinder arrangements are connected to a source of pneumatic pressure; alternatively they may be connected to a source of hydraulic pressure.

Therefore, the shoes of the back-up clamp component according to the invention can be urged to their clamping position by pneumatic or hydraulic pressure. In the case of pneumatic pressure a,compressor providing perhaps 200 psi can readily be provided so that the shoes are urged outwardly with far greater force than is available with the prior art "spring-biassed" devices. Accordingly, the force with which the shoes are moved will assist in ensuring that the pipe ends are concentric, the component forcing those pipe ends into alignment.

Preferably, the body of the component is annular and an internal collar is located therein. Preferably also the collar has a flange. Desirably, the flange has a part of a conduit therein; desirably also the flange provides a part of an end face of the component. Usefully, the collar includes a recess means through which pressurised fluid can be communicated to one side of the piston.

Usefully also, the collar includes an annular depression aligned with the axis of the cylinders, the annular depression ensuring that a substantially equal pressure is imparted to each of the pistons.

Preferably, sealing means is provided between the collar and the body of the component.

Preferably, a cap member is provided for each cylinder, the cap member having an opening through which the piston stem an project. Preferably also, the cap member covers a part of the body of the component, the means to introduce pressurised fluid to the second side of the piston including a conduit which opens into said part of the body of the component. Preferably also, the cap member includes a recess means by which fluid can flow from said conduit into the cylinder.

Desirably each shoe is connected to a respective carrier member, each carrier member having a shoulder which can engage an adjacent shoe. Accordingly, if one of the piston and cylinder arrangements should fail to operate (i.e. to move outwardly), or be slow to operate, its respective shoe can nevertheless be moved to its clamping position by the adjacent carrier members. This will also assist if there is any dirt or debris hindering the movement of one of the shoes, three adjacent carrier members can act to urge the shoe towards its clamping condition so pushing any dirt or debris out of the way. Similarly, the two adjacent shoes can help to drive back the intermediate shoe by way of their engagement with the carrier member of that shoe.

Preferably, each carrier member is slidably mounted to a link member, the carrier member being longitudinally movable relative to the link member. Preferably also, each carrier member is resiliently biassed relative to its link member, adjacent carrier members being biassed in opposite directions.

Usefully, the shoes are of isosceles trapezium or triangular form, having angled edges, with adjacent shoes being oppositely directed. The edges of each shoe may therefore be maintained in permanent engagement with the adjacent shoes. The shoes are preferably biassed so that as they move inwardly and outwardly their edges slide relative to the edges of the adjacent shoes, but are maintained in contact therewith. Maintaining the edges between adjacent shoes in contact reduces the likelihood of dirt or debris entering between the edges, and so reduces the likelihood that the shoes cannot together form a circular periphery.

BRIEF DESCRIPTION OF THE DRAWINGS

The invention will now be described, by way of example, with reference to the accompanying drawings, in which:

FIG. 2 is a schematic representation of part of the clamp component;

FIG. 3 is a side view of the collar of the component;

FIG. 4 is an end view of part of the collar;

FIG. 5 is a side view of the cap member of the component;

FIG. 6 is a side view of the first part of the cap member;

FIG. 7 is a plan view of the first part of the cap member;

FIG. 8 is a side view of a piston;

FIG. 9 is a plan view of the piston;

FIG. 10 is an end view of a link member;

FIG. 11 is an underside view of the link member;

FIG. 12 is a cross-sectional view of the body of the back-up clamp component;

FIG. 13 is a sectional view along the line XIII—XIII of FIG. 12;

DESCRIPTION OF THE PREFERRED EMBODIMENTS

Figure 1:
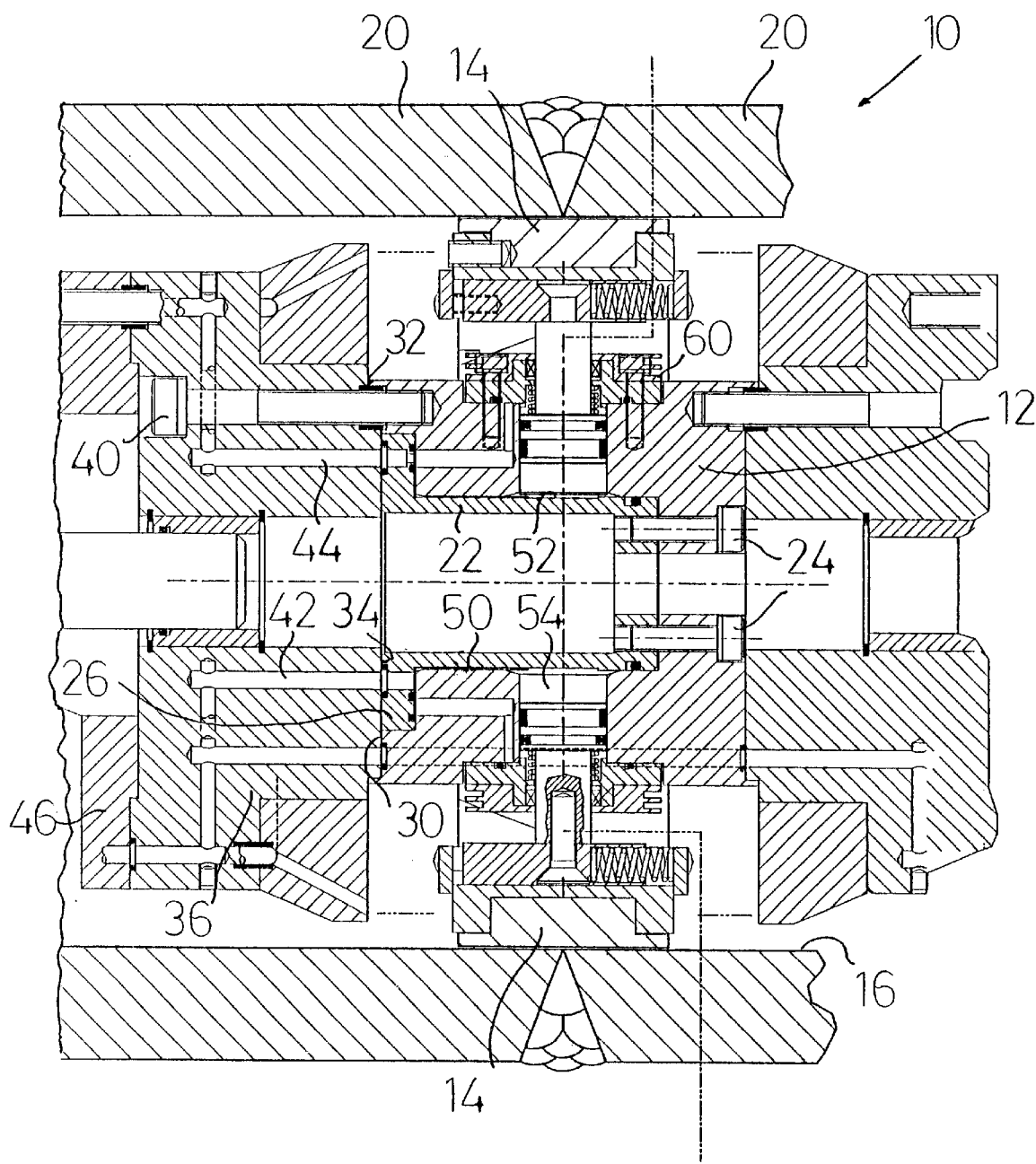
FIG. 1 is a drawing showing the back-up component according to the invention, secured to adjacent sections of a back-up clamp.

The back-up clamp component 10 comprises a body 12 to which is movably connected a number of back-up shoes 14; in this embodiment there are six shoes 14, only two of which can be seen in the sectional view of FIG. 1.

The component is shown in its extended condition in FIG. 1, with the shoes 14 in contact with the inside surface 16 of two adjacent pipes 20 of the pipeline, and immediately beneath the welded joint which has just been formed between the pipes 20.

An internal collar 22 is fitted into the body 12, and is secured there by way of cap-head screws 24. The internal collar 22 has a flange 26 (see also FIG. 3), the flange providing a part of the end face 30 of the component 10. In this embodiment the end face 30 is substantially planar, but has a peripheral lip 32. The end face 30 is adapted to be secured against the cooperating end face 34 of an adjacent section 36 of the assembled back-up clamp, the section 36 and the component 10 being secured together by a number of cap-head screws 40 (only one of which can be seen in FIG. 1).

The purpose of the lip 32 is to ensure correct alignment between the section 36 and the component 10, and facilitates assembly of the clamp. In alternative embodiments, the cooperating end faces can include steps or other cooperating formations, or can be totally planar, as desired.

It is an important feature of the invention that the conduits 42 and 44 which communicate pressurised fluid to the piston (as described below) are open to end face 30, and as seen in FIG. 1 are aligned with conduits in section 36 which in turn communicate with conduits in other sections in the body of the assembled clamp (such as section 46) so that pressurised fluid may be delivered to the conduits 42 and 44 through the body of the clamp, and not require any external hoses around any part of the clamp body.

The conduit 42 is formed in a part of the flange 26 of the collar 22. The conduit 42 communicates with a longitudinal recess 50 along the sleeve portion of the collar (see also FIGS. 2 and 4), which recess opens out into annular depression 52 (see also FIGS. 2 and 3). Annular depression 52 lies beneath all of the cylinders 54, and permits pressurised fluid (which enters the component at only a single axial position), to be communicated to all of the cylinders, so that a substantially equal pressure is exerted on each of the pistons.

Similarly, the fluid to drive the pistons inwardly is introduced into the component at only one axial position, along conduit 44, but must be communicated to all of the pistons, substantially equally. This is achieved by an annular recess 56 (FIGS. 2, 3) in the flange 26 of the collar which communicates the single part 44a of conduit 44 within the flange with the six axially spaced parts 44b of conduit 44 within the body 12, i.e there is one conduit part 44b for each of the six cylinders.

Each of the six conduit parts 44b are formed through the body 10 and open underneath a respective cap member 60.

The form of the cap member 60 is better seen in FIGS. 2 and 5–7. Thus, the first part 62 of the cap member 60 includes a recess 64; fluid can flow from the conduit part 44b into the recess, and through one of two slots 66 formed in the lip 70, and so into the cylinder 54 above the piston 80.

It will therefore be understood that the introduction of pressurised fluid into the conduit 42 will drive all of the pistons 80 (and the back-up shoes 14 carried thereby) outwardly into their extended positions, whilst the introduction of pressurised fluid into the conduit 44 will drive all of the pistons 80 inwardly into their retracted conditions.

In addition, a compression spring 82 is located within each cylinder, to drive each piston 80 towards its retracted condition. The spring does not affect the operation of the clamp since it is easily over-riden by pressurised fluid acting to drive the shoes 14 to their extended positions; however, in the event of a failure of the pressurised fluid the springs 82 will retract the shoes 14, providing a fail-safe condition in which the clamp can be moved along the pipeline.

In FIG. 2, both of the conduits 42 and 44 are shown in the same sectional view (and in FIG. 1 they are shown 180° apart). It will be apparent from FIG. 4, however, that these conduits are spaced apart by approximately 30° around the body 12. In alternative embodiments, the conduits can be at the same axial position, or spaced apart by a chosen angle, as desired to cooperate with the conduits in the section 36.

As seen in FIGS. 8 and 9, the piston 80 has an a circular formation 84 thereon, which locates into a correspondingly shaped recess 86 in the link member 90 (FIGS. 10, 11).

Figure 14:
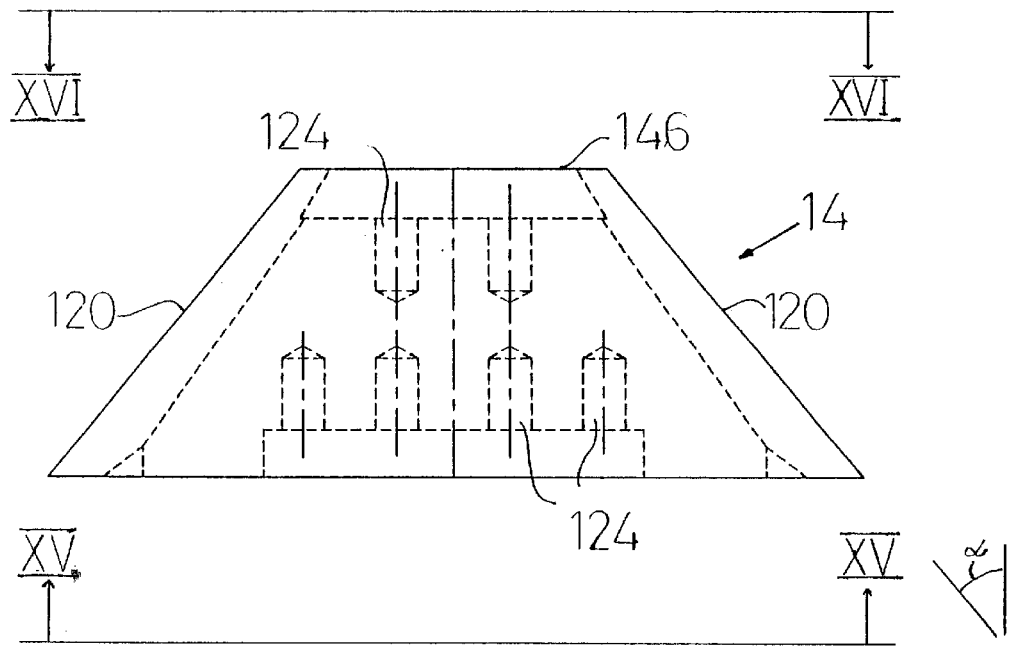
FIG. 14 is a plan view of a back-up shoe.
Figure 15:
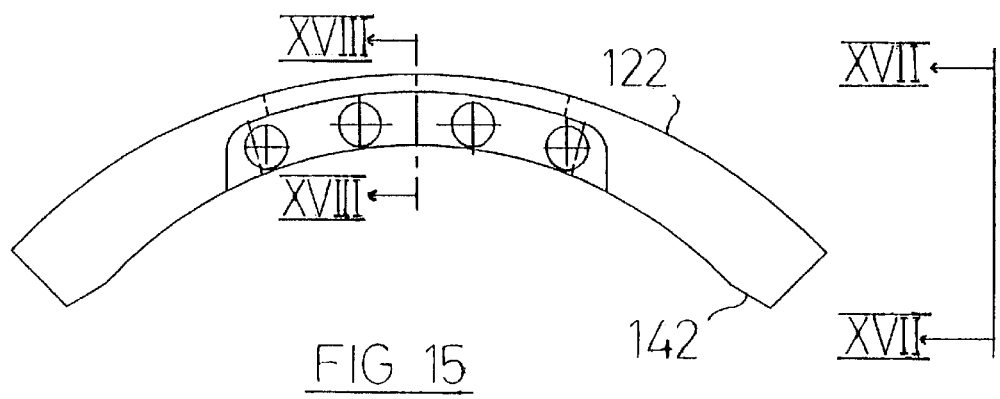
FIG. 15 is a view along the lines XV—XV of FIG. 14.
Figure 16:
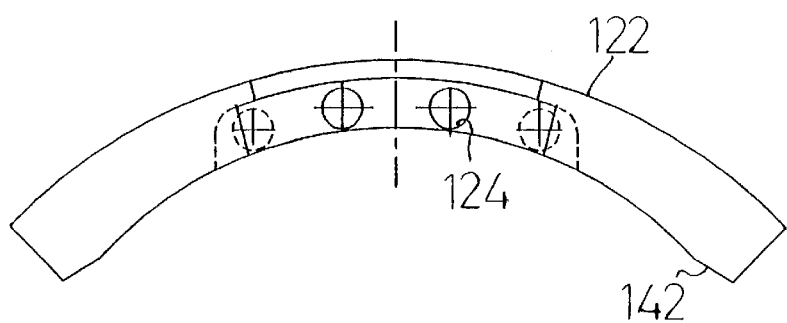
FIG. 16 is a view along the lines XVI—XVI of FIG. 14.
Figure 17:
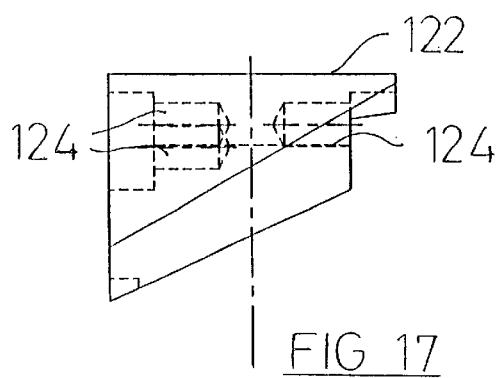
FIG. 17 is a view along the lines XVII—XVII of FIG. 16.
Figure 18:
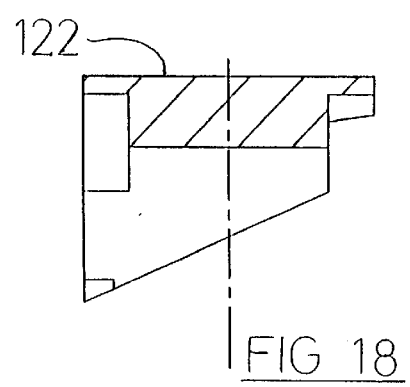
FIG. 18 is a view along the lines XVIII—XVIII of FIG. 16.

As seen in FIG. 14, the shoes 14 each have correspondingly angled edges 120, the edges 120 of each shoe being in sliding engagement with the edges of two adjacent shoes, in known fashion. Each shoe is in the form of an isosceles trapezium (when viewed radially) i.e. with two parallel lateral edges of differing lengths interconnected by two angled edges 120, the angled edges being at equal and opposite angles with respect to the lateral edges.

Figure 19:
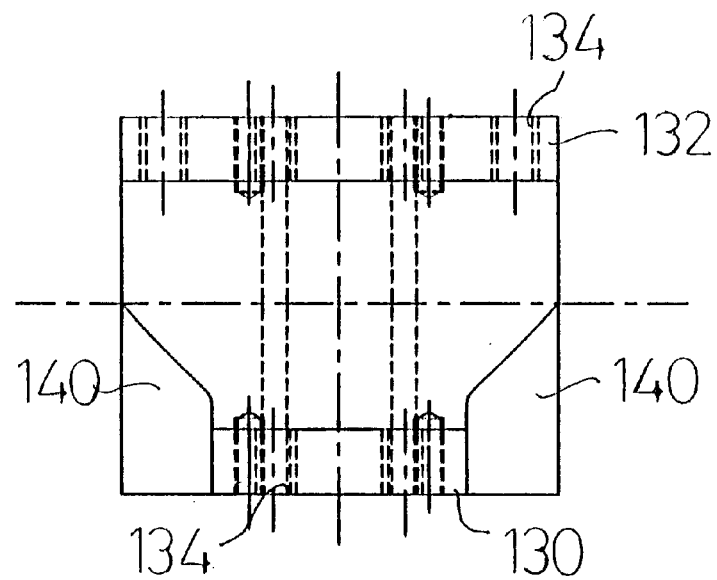
FIG. 19 is plan view of a carrier member.
Figure 20:
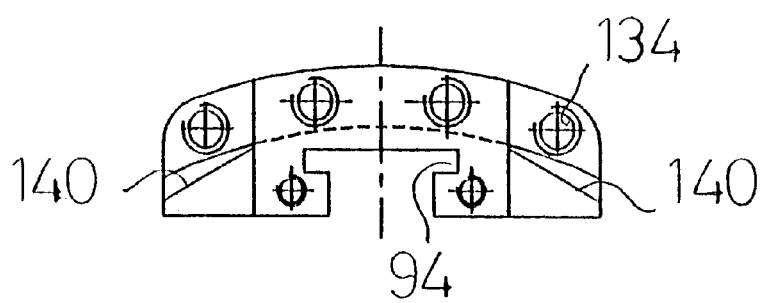
FIG. 20 is an and view of the carrier member.
Figure 21:
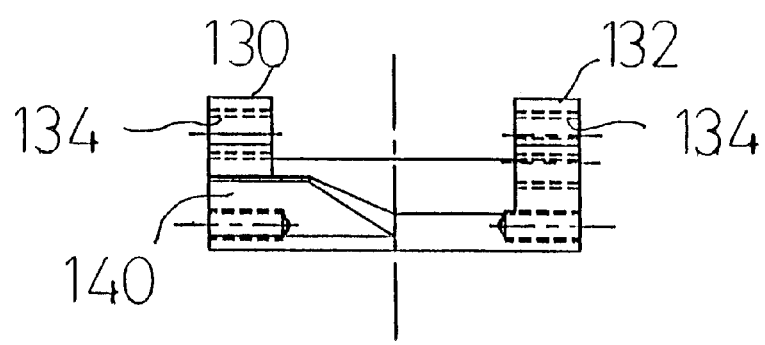
FIG. 21 is a side view of the carrier member.
Figure 22:
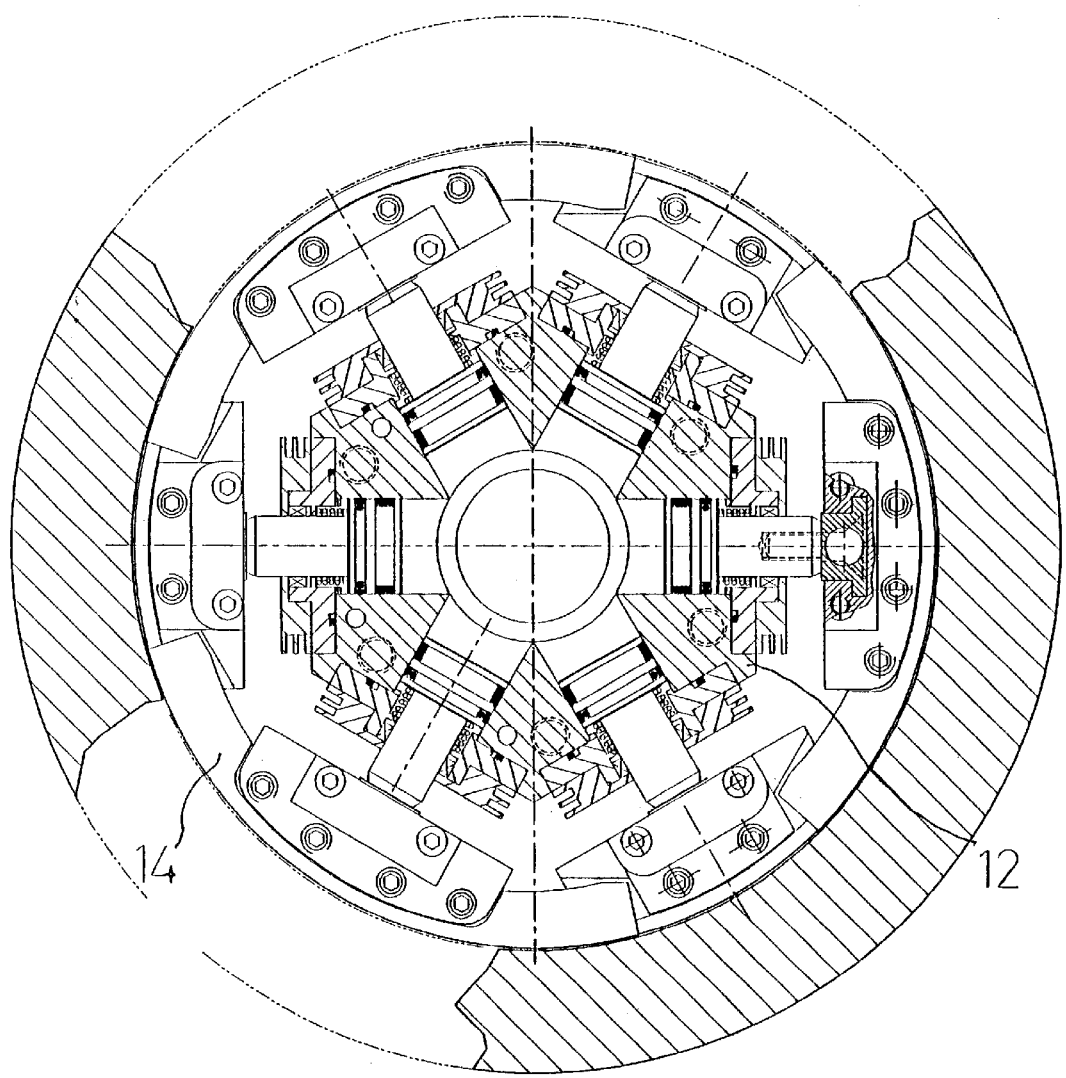
FIG. 22 is a cross-sectional view of an assembled back-up clamp component.

FIGS. 14–18 show the detail of each shoe 14. The shoe 14 has a peripheral surface 122 which is of part-circular form, having a radius of curvature matching that of the pipeline which it is intended to fit. The shoe has six tapped bores 124 which can receive screws or bolts (not shown) by which the shoe can be attached to its carrier member 126 (FIGS. 19–21). The edges 120 are angled at an angle α of 45° in this embodiment, though other angles can be used as desired, preferably between 30° and 60°, ideally between 40° and 50°.

The head 92 of the link member 90 locates in correspondingly shaped grooves 94 (FIG. 20) of a carrier member 126. Accordingly, the carrier member 126 is caused to move with the piston in the longitudinal direction of the piston, but the carrier member 126 can slide relative to the link member 90 into and out of the paper as drawn in the orientation of FIGS. 10 and 20.

FIGS. 19–21 show the detail of each carrier member 126. The carrier member 126 has a flange 130 at one end and a flange 132 at the other end. The flange 130 has two apertures 134 and the flange 132 has four apertures 134, the apertures 134 receiving screws or bolts for connection to the bores 124 in the shoe 14. When the screws or bolts (not shown) are fitted, the carrier member 126 is rigidly secured to its respective shoe 14.

It is a particular feature of the invention that the carrier member 126 has two shoulders 140, which shoulders 140 can engage a surface 142 of the adjacent shoe 14 to either side of the carrier member 126. Thus, each carrier member 126 is rigidly connected to one shoe 14 and directly drives that shoe inwardly and outwardly in response to movements of its respective piston 80; however, each carrier member 126 also indirectly drives the adjacent two shoes 14 outwardly by way of engagement of the shoulders 140 with the respective surfaces 142. In this way, the movement of all of the shoes 14 is linked, and if one of the piston and cylinder arrangements should for any reason act slowly or not at all, its shoe can nevertheless be urged outwardly by the two carrier members 126 of the adjacent shoes 16. It will be understood that the surface 142 slides across the shoulder 140 as the shoes 14 move outwardly and inwardly.

Similarly, each shoe 14 can act to force inwardly the two adjacent shoes should this be necessary, by way of its surfaces 142 engaging the shoulders 140 of the adjacent carrier members.

In order to effect the relative longitudinal sliding of the shoes 14, a spring (not shown) is located within hole 144 of the link member 90, the spring urging the carrier member 126 (and thus the corresponding shoe 14) in the direction towards its narrower end 146.

The shoes 14 are manufactured from copper "101". The body 12, collar 22, pistons 80, link members 90 and carrier members 126 are all manufactured from stainless steel "303", which does not corrode and is also non-magnetic so that it does not attract and retain particles present within the pipeline.

Though the shoes 14 of the embodiment described are isosceles trapeziums, in an alternative embodiment they are triangular, i.e. the narrower end (146) terminates at a point. Thus, for smaller diameter pipelines with which the clamp is to be used it is desirable to increase the angle a as the radius of curvature of the shoes 14 decreases, so as to ensure that the shoes do not "bind" together, i.e. the edges 120 of adjacent shoes become fixed together so that the pistons cannot be retracted. The angle α might for example be increased until the edges 120 meet at a point.

What is claimed is:

1. A component for a back-up clamp, the component having a body, the body having an end face adapted to engage another section of the back-up clamp, the body carrying a number of shoes which can be moved radially inwardly and outwardly, each shoe being connected to a respective piston and cylinder arrangement, each piston and cylinder arrangement having an axis which is substantially radial, each piston having a first side and a second side, first means permitting pressurised fluid to be introduced to the first side of a piston and second means permitting pressurised fluid to be introduced to the second side of a piston so that the shoes can be positively driven outwardly and inwardly, the first means and the second means including respective first and second conduits within the body, wherein the first and second conduits open at the end face.

2. A component according to claim 1 wherein the body is annular and an internal collar is located in the body.

3. A component according to claim 2 wherein the internal collar has a flange.

4. A component according to claim 3 wherein at least one of the first and second conduits passes through the flange.

5. A component according to claim 3 wherein the flange provides a part of the end face.

6. A component according to claim 2 wherein the internal collar includes a collar recess means which provides a part of the first conduit.

7. A component according to claim 6 wherein the collar includes an annular depression aligned with the axis of all of the piston and cylinder arrangements, the annular depression also providing a part of the first conduit.

8. A component according to claim 2 wherein sealing means is provided between the internal collar and the body.

9. A component according to claim 1 wherein a cap member is provided for each cylinder, and wherein each piston has a respective stem, the cap member having an opening through which the stem of a piston can project.

10. A component according to claim 9 wherein the cap member covers a part of the body, and wherein a part of the second conduit opens into said part of the body.

11. A component according to claim 10 wherein the cap member includes a cap recess means adjacent said part of the body, said cap recess means providing a part of the second conduit.

12. A component according to claim 1 wherein a carrier member is connected to each shoe, each carrier member having a shoulder which can engage an adjacent shoe.

13. A component according to claim 12 having a link member for each carrier member, and wherein each carrier member is slidably mounted to its respective link member, the carrier member being longitudinally slidable relative to its respective link member.

14. A component according to claim 13 wherein each carrier member is resiliently biassed relative to its link member, and wherein adjacent carrier members being biassed in opposite directions.

15. A component according to claim 1 wherein the shoes are of isosceles trapezium form, having angled edges, and wherein adjacent shoes are oppositely directed.

16. A component according to claim 15 wherein the shoes are biassed so that as they move inwardly and outwardly their edges slide relative to the edges of the adjacent shoes, but are maintained in contact therewith.

17. A component according to claim 1 wherein the shoes are of triangular form, having angled edges, and wherein adjacent shoes are oppositely directed.

18. A component according to claim 17 wherein the shoes are biassed so that as they move inwardly and outwardly their edges slide relative to the edges of the adjacent shoes, but are maintained in contact therewith.

* * * * *